(12) United States Patent
Chen et al.

(10) Patent No.: US 7,292,725 B2
(45) Date of Patent: Nov. 6, 2007

(54) DEMOSAICKING METHOD AND APPARATUS FOR COLOR FILTER ARRAY INTERPOLATION IN DIGITAL IMAGE ACQUISITION SYSTEMS

(75) Inventors: Chih-Lung Chen, Taoyuan (TW); Chien-Hong Lin, Jhudong Township, Hsinchu County (TW); Chung-Hsien Wu, Taipei (TW); Zong-Yau Yin, Taichung (TW); Chi-Lung Wang, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 505 days.

(21) Appl. No.: 11/069,327

(22) Filed: Mar. 1, 2005

(65) Prior Publication Data

US 2006/0104505 A1 May 18, 2006

(30) Foreign Application Priority Data

Nov. 15, 2004 (TW) .............................. 93134913 A

(51) Int. Cl.
*G06K 9/00* (2006.01)

(52) U.S. Cl. .................. 382/167; 382/162; 382/274; 348/222.1; 348/273

(58) Field of Classification Search ................ 382/162, 382/164, 165, 166, 167, 274; 358/512, 518, 358/519, 520, 521, 522; 348/222.1, 223.1, 348/273, 242, 743
See application file for complete search history.

(56) References Cited

U.S. PATENT DOCUMENTS

| | | | |
|---|---|---|---|
| 4,630,307 A | 12/1986 | Cok | 382/25 |
| 4,642,678 A | 2/1987 | Cok | 358/44 |
| 4,724,395 A | 2/1988 | Freeman | 328/151 |
| 5,373,322 A | 12/1994 | Laroche et al. | 348/273 |
| 5,382,976 A | 1/1995 | Hibbard | 348/273 |
| 5,629,734 A | 5/1997 | Hamilton, Jr. et al. | 348/222.1 |

(Continued)

OTHER PUBLICATIONS

Effective Color Interpolation In CCD Color Filter Arrays Using Signal Correlation (p. 503-513) IEEE Transactions on Circuits and Systems for Video Technology, vol. 13, No. 6, Jun. 2003.
Color Plane Interpolation Using Alternating Projections (p. 997-1013) IEEE Transactions on Image Processing, vol. 11, No. 9, Sep. 2002.

(Continued)

*Primary Examiner*—Matthew C. Bella
*Assistant Examiner*—Ali Bayat

(57) ABSTRACT

A demosaicking method and apparatus for color filter array interpolation in digital image acquisition systems is provided. The method includes a data-training phase and a data-practice phase. In the data-training phase of this invention, a huge volume of image samples are received for statistical analysis and compared with their corresponding full-color images. The optimal samples are then recorded in a database. In the data-practice phase of this invention, the images of color filter array are reconstructed. The present invention not only significantly improves the image quality but also reduces undue hardware cost. Furthermore, it has an advantage of ease of hardware implementation. All the color relationships of neighboring pixels are recorded in a database for statistical analysis. The database is not limited to only one set. It is also pretty flexible, and can be adjusted or updated depending on desired applications.

24 Claims, 8 Drawing Sheets

U.S. PATENT DOCUMENTS

| | | | |
|---|---|---|---|
| 6,829,016 B2* | 12/2004 | Hung | 348/581 |
| 7,088,392 B2* | 8/2006 | Kakarala et al. | 348/272 |
| 2002/0063789 A1* | 5/2002 | Acharya et al. | 348/273 |
| 2003/0052981 A1* | 3/2003 | Kakarala et al. | 348/272 |
| 2003/0117507 A1* | 6/2003 | Kehtarnavaz et al. | 348/242 |
| 2004/0161145 A1* | 8/2004 | Embler | 382/165 |
| 2005/0146629 A1* | 7/2005 | Muresan | 348/280 |

OTHER PUBLICATIONS

New Edge-Directed Interpolation (p. 1521-1527) IEEE Transactions on Image Processing, vol. 10, No. 10, Oct. 2001.

Demosaicing: Image Reconstruction from Color CCD Samples (p. 1221-1228) IEEE Transactions on Image Processing, vol. 8, No. 9, Sep. 1999.

* cited by examiner

| pattern index | feasible coefficient set of green color | error value |
|---|---|---|
| 000 000 000 | 0001 | 0 |
| | 0010 | 0 |
| | ...... | ...... |
| | 3320 | 0 |
| | ...... | ...... |
| 000 001 011 | 0001 | 32 |
| | 0010 | 234 |
| | 0011 | 129 |
| | 0100 | 56 |
| | 1100 | 2 |
| | ...... | ...... |
| | 3320 | 54 |
| ... | ... | ... |

211 — pattern index
212 — feasible coefficient set of green color
213 — error value

FIG. 2B

| pattern index | feasible coefficient set of red color | error value |
|---|---|---|
| 000 000 000 | 0001 | 0 |
| | 0010 | 0 |
| | ...... | ...... |
| | 3320 | 0 |
| ...... | ...... | ...... |
| 000 001 011 | 0001 | 765 |
| | 0010 | 562 |
| | 0011 | 34 |
| | 0100 | 385 |
| | 2110 | 12 |
| | ...... | ...... |
| | 3320 | 77 |
| ...... | ...... | ...... |

FIG. 2C

| PSNR | | Gunturk | Lu | PR + BP | Pei + BP | present invention+BP |
|---|---|---|---|---|---|---|
| image sample1 | R | 43.877887 | 43.062887 | 40.884287 | 41.244987 | 41.395887 |
| | G | 45.179787 | 46.470387 | 43.763187 | 44.515587 | 44.767487 |
| | B | 41.281187 | 43.205987 | 41.364187 | 41.782087 | 41.832687 |
| | | | | | | |
| image sample2 | R | 39.112087 | 38.240687 | 35.447187 | 36.691987 | 38.194387 |
| | G | 42.711187 | 40.038187 | 38.338487 | 40.593087 | 41.663987 |
| | B | 36.931687 | 37.647387 | 34.991487 | 36.424787 | 37.336387 |
| | | | | | | |
| image sample3 | R | 42.836487 | 43.338187 | 40.722087 | 41.725787 | 41.460587 |
| | G | 44.757087 | 45.801887 | 43.227987 | 44.179987 | 44.203487 |
| | B | 39.942687 | 42.017687 | 39.795587 | 40.174087 | 40.476887 |
| | | | | | | |
| image sample4 | R | 35.479987 | 35.001087 | 32.409787 | 31.919387 | 34.680587 |
| | G | 39.364087 | 37.251587 | 35.549887 | 36.223387 | 38.512687 |
| | B | 34.519587 | 35.168887 | 32.350387 | 32.125787 | 34.693687 |
| | | | | | | |
| image sample5 | R | 43.026587 | 43.024387 | 40.275387 | 40.909787 | 41.691987 |
| | G | 45.693687 | 45.089587 | 42.917087 | 44.434187 | 44.790687 |
| | B | 40.647787 | 42.036187 | 39.808387 | 40.522487 | 41.235587 |
| image sample6 | R | 39.794387 | 38.971987 | 36.549887 | 37.810487 | 38.195187 |
| | G | 42.397387 | 41.051887 | 39.285787 | 41.624887 | 41.705087 |
| | B | 39.323787 | 39.538487 | 36.499487 | 38.320587 | 38.450887 |
| PSNR | | Gunturk | Lu | PR + BP | Pei + BP | present invention+BP |
| image sample7 | R | 41.669087 | 41.273587 | 38.625287 | 39.689787 | 41.537787 |
| | G | 46.002787 | 43.152687 | 41.695087 | 43.525387 | 44.910287 |
| | B | 40.206687 | 40.766987 | 38.282687 | 39.327687 | 40.693487 |
| | | | | | | |
| image sample8 | R | 39.420187 | 39.465087 | 37.076287 | 36.646787 | 38.554987 |
| | G | 43.980587 | 41.612887 | 39.940487 | 40.769387 | 42.273687 |
| | B | 39.383587 | 39.464387 | 37.033287 | 37.107987 | 39.034887 |
| | | | | | | |
| image sample9 | R | 37.811487 | 39.780187 | 38.659187 | 37.568987 | 40.303187 |
| | G | 44.813087 | 41.069387 | 41.051187 | 41.276087 | 43.294787 |
| | B | 39.202087 | 32.700987 | 37.791387 | 37.248287 | 39.086387 |
| | | | | | | |
| image sample10 | R | 39.378487 | 38.601387 | 35.862087 | 37.896287 | 38.082487 |
| | G | 42.991487 | 40.023287 | 38.388387 | 41.345387 | 41.273287 |
| | B | 38.448687 | 38.138587 | 35.380287 | 37.518287 | 37.374687 |
| | | | | | | |
| image sample11 | R | 38.794087 | 38.829587 | 36.841387 | 37.764487 | 37.921687 |
| | G | 41.459387 | 41.420487 | 39.758587 | 41.005787 | 41.012587 |
| | B | 37.747887 | 38.682887 | 36.733887 | 37.416887 | 37.597887 |
| | | | | | | |
| image sample12 | R | 35.202887 | 34.604887 | 32.627487 | 35.603187 | 35.281587 |
| | G | 38.459087 | 36.525687 | 35.142587 | 38.793287 | 38.464487 |
| | B | 34.270787 | 34.004087 | 31.707187 | 34.825387 | 34.040187 |

FIG.5

| Operation | Gunturk | | Pei+BP | | LU | | PR+BP | | present invention+BP | |
|---|---|---|---|---|---|---|---|---|---|---|
| | G channel | R/B channel | G channel | R/B channel | G channel | R/B channel | G channel | R/B channel | G channel | R/B channel |
| Addition | 21+35*3 | | 8 | 12+19 | 54 | 62*2+29 | 11 | 16+19 | 14 | 19+19 |
| Shift | 11+2*3 | | 3 | 2+1 | 12 | 16*2+1 | 4 | 2+1 | 4 | 5+1 |
| Multiplication | 42*3 | | | | 4 | 4*2+9 | | | 4* | 4* |
| Division | 10*3 | | | | 5 | 5*2+1 | | | | |
| Comparison | 1 | | | 0+1 | | 0+57 | 10 | 0+1 | 10 | 10+1 |
| Absolute value | 4 | | | | 20 | 24*2+1 | | | | |
| Register | | | | 0+1 | | | | 0+1 | 1 | 1+1 |

FIG. 6

DEMOSAICKING METHOD AND APPARATUS FOR COLOR FILTER ARRAY INTERPOLATION IN DIGITAL IMAGE ACQUISITION SYSTEMS

FIELD OF THE INVENTION

The present invention generally relates to an image processing method and apparatus, and more specifically to a demosaicking method and apparatus for color filter array (CFA) interpolation in digital image acquisition systems.

BACKGROUND OF THE INVENTION

In recent years, digital still camera (DSC), digital video (DV), and scanner have been widely utilized to take pictures and to record progress of colorful life as the technology of digital image acquisition advances rapidly. However, recording a digital image requires many processing steps which include white balance adjustment, gamma correction, data compression, and so forth. Interpolation and reconstruction of CFA, which is the so called "demosaicking", is one of the most important processing step.

There are many kinds of patterns adopted in CFAs. Among them, Bayer CFA of three colors is the most common one, which filters red, green, and blue. Some other CFAs of four colors filter cyan, magenta, yellow, and green. Taking the commonly adopted Bayer CFA as an example, a typical CFA is described below.

Each pixel of a color image requires at least three basic colors to construct the hues of original color image. Red, green, and blue three basic colors are often adopted in a typical computer image. If the color image of a scenery is to be truly presented, at least three image sensors are required to record the three basic colors of each pixel. In order to reduce the form factor and to save the hardware cost, the majority of image acquisition systems only contain a single image sensor with a CFA. However, a CFA is a regular pattern of color filters that allow the image sensor to detect only one basic color at each pixel location. This means that an image acquisition system must reconstruct three full colors for each pixel, including the other two undetected colors. This is the so called "demosaicking" process.

Since the bayer CFA pattern was disclosed in 1976, many demosaicking methods have been proposed. In general, the demosaicking methods are roughly separated into two kinds. In the first kind, no detection of edges is performed. Instead, same mathematical formula is repeatedly applied to each pixel. In the second kind, prior knowledge of some geometric patterns is utilized to detect if edges exist between a target pixel and other pixels in the neighborhood. If an edge is found, an appropriate demosaicking algorithm will be selected and applied to reconstruct the missing colors of the target pixel depending on the feature of the edge.

There is no detection of edges for the first kind of demosaicking methods. The simplest way to generate a full color image is to adopt a traditional bilinear interpolation. It utilizes the values of a missing color detected by the neighboring pixels to reconstruct the value of the missing color for the target pixel through some form of linear interpolation. Though the above method is simple and easy to implement, the bilinear interpolation usually results in bad by-products accompanied with the demosaicking process, e.g., the appearance of colored artifacts and fringes.

In 2000, Pei proposed a demosaicking method ("Effective color interpolation in CCD color filter array using signal correlation," IEEE Image Processing) based on the high correlation between the R, G, B channels. By defining Kr equal to the value difference between G and R and Kb equal to the value difference between G and B, a theory was then developed by treating these two values as continuous constants to derive mathematic formulas for the other two missing colors.

According to U.S. Pat. No. 4,642,678, Cok disclosed a simple phenomenon about spectrum relationship between different color planes. Within small neighborhoods in a image, the color ratios of red/green and blue/green are very similar. This phenomenon has been applied to many schemes to interpolate the missing color value through the information obtained from other colors planes. Besides the color ratios, color differences are also used by many other schemes that adopted a similar concept for interpolation of missing color values. However, the schemes described above still cannot resolve the unwanted colored fringes and hue (color ratio) shifts introduced in areas of image detail.

In 2002, Gunturk et al ("Color plane interpolation using alternating projections," IEEE Trans. Image Processing) proposed an effective method for interpolation of missing color values. The authors used original CFAs to form constraint sets. The junction of these two constraint sets represents the space of acceptable solution and can be estimated through the above mentioned spectrum relationship and an alternating projection. The missing color values of each pixel are then derived from the junction of these two constraint sets. In 2003, another method for interpolating missing color values was proposed by Lu et al ("On new method and performance measures for color filter array," IEEE Trans. Image Processing). In this method, the authors took into consideration of the color relationships of a target pixel with its neighboring pixels in four different directions, i.e., up, down, left and right. The bigger the difference of the brightness between target pixel and same-color pixel in the interpolation direction is, the smaller the spatial relationship between them. A mathematical formula for the missing color is then derived. Moreover, Lu also adopted an adaptive median filtering method for post processing of demosaicking.

According to US Patent Publication 2003/0215159, Okuno et al disclosed a pixel interpolation device which includes an interpolation pattern table. The interpolation pattern table outputs interpolation direction data designating interpolation directions. Each interpolated pixel data is calculated based on a pixel data located in an interpolation direction designated by an interpolation direction data.

For the second kind of demosaicking methods, a detection of edges is performed. In 1986, Cok (U.S. Pat. No. 4,630,307) proposed a demosaicking method based on pattern recognition (PR). Firstly, a plurality of different interpolation routines are provided to generate appropriate interpolated values, and to complete respective geometrical features. And, local neighborhoods of a target pixel around the interpolation location are examined to see if they match with some existing geometrical features, such as edge, line, and corner. If an existing geometrical feature is detected, then the interpolation routine appropriate for the detected feature is applied to generate an interpolated signal value. If there is no match, the simple bilinear interpolation method will be applied to estimate the missing color value. Generally speaking, using spatial relationship of neighboring pixels to interpolate the missing colors will improve the appearance of colored fringes. This kind of interpolation methods is better than those methods in which edges are ignored. For example, Laroche et al (U.S. Pat. No. 5,373,322) proposed an edge pattern classification method to select a preferred orientation for the interpolation of missing colors. The interpolation is then performed upon values selected along with the preferred orientation.

According to U.S. Pat. No. 5,629,734, Hamilton et al proposed a demosaicking apparatus in which Laplacian second-order values and gradient values are utilized as detection tools of edges to select a preferred orientation for the interpolation of missing color value.

Besides, some people adopt a combined scheme by using at least two demosaicking processes to obtain sharp color edges and to reduce undesirable by-products resulted from the demosaicking process. In 1999, Kimmel ("Demosaicking: image reconstruction from color CCD samples," IEEE Trans. Image Processing) adopted an edge-oriented technique to get the missing colors. The authors used some edge-patterns recognitions to interpolate color values or color ratios of four neighboring pixels. At the same time, an inverse diffusion process is applied to suppress the unwanted by-products accompanied with the demosaicking process. In 2001, Li et al ("New edge-directed interpolation," IEEE Trans. Image Processing) disclosed a method for detecting edges. Based on geometric duality and edge-orientated property of the covariance between low-resolution CFA image and high resolution post-demosaicking image as well as the brightness difference between different color planes, the missing two colors are interpolated.

There are plenty of existing demosaicking methods and apparatuses. They are mainly used for producing high-quality post-demosaicking images. However, a practical demosaicking method and apparatus must be able to improve image sharpness and colored fringes without unduly increasing hardware cost.

SUMMARY OF THE INVENTION

The present invention provides a demosaicking method to not only improve image sharpness and colored fringes but also reduce undue hardware cost. Its main objective is to provide a method for CFA interpolation in digital image acquisition systems.

The method of the present invention includes two different phases, a data-training phase and a data-practice phase. The data-training phase comprises the following steps: (a1) prepare a plurality of CFA image samples and their corresponding full-color images, wherein each pixel of every full-color image contains at least three colors values. (a2) select a corresponding concentrative window for each color of every target pixel in the CFA image samples, and quantize color values of all the pixels in the concentrative window to form a pattern index. (a3) use multiple feasible coefficient sets to reconstruct the value of each missing color of every target pixel based on the color values of the pixels in the corresponding concentrative window and their corresponding pattern indexes, and then calculate the error between the actual color value and the reconstructed color value. (a4) determine the optimal combination of coefficients of the pattern index for each missing color, and then output the results to a database.

The data-practice phase comprises the following steps: (b1) input a CFA image, and select a corresponding concentrative window for each target pixel in the CFA image sample, and quantize color values of all the pixels in the concentrative window to form a set of pattern index. (b2) input the corresponding pattern index of each missing color for every target pixel to the database described at step (a4) to get the optimal combination of coefficients of the corresponding pattern index, and then calculate the reconstructed values of the missing colors for every target pixel according to the color values of the pixels in the corresponding concentrative window.

Another objective of the present invention is to provide a demosaicking apparatus. The apparatus of this invention comprises a sampling element, a quantizer, an error calculator and selector, a database storage, and an image reconstructor. Based on the plural input CFA images, the sampling element selects a corresponding concentrative window for each color of every target pixel in the CFA images, and then extracts original color values of all the pixels in the concentrative window. The quantizer receives and quantizes the original color values of all the pixels in the concentrative window to form a set of pattern index. The error calculator and selector receives the original color values of all the pixels in the concentrative window and their corresponding set of pattern index generated by the quantizer. Based on the corresponding full-color images of the input CFA images, the error calculator and selector uses multiple feasible coefficient sets to get a reconstructed color value of each missing color of every target pixel. The error between reconstructed color value and actual color value is then calculated. An optimal combination of coefficients of the pattern index for each missing color of the target pixel is determined based on the multiple feasible coefficient sets and their corresponding accumulated errors.

The database storage receives and stores the pattern index and the optimal combination of coefficients of the pattern index for each missing color generated by the error calculator and selector. According to the pattern index generated by the quantizer, the database storage reproduces an optimal combination of coefficients of the pattern index for each missing color. The image reconstructor generates a reconstructed color value of each missing color for every target pixel based on the optimal combination of coefficients of the pattern index generated by the database storage for each missing color of the target pixel and the color values of the pixels in the corresponding concentrative window.

The main purpose of the present invention is to obtain a similar image quality but reduce the hardware cost as compared to other conventional schemes. The statistical database generated in the data-training phase is stored in a storage device. Users can change the statistical analysis method, and adjust or update the database depending on users' needs. Moreover, the database is not limited to only one set. It is also pretty flexible, and can be adjusted or updated depending on different conditions.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 2B shows a relationship table of pattern index, feasible coefficient set of green color, and error value for a target pixel according to the present invention.

FIG. 2C shows a relationship table of pattern index, feasible coefficient set of red color, and error value for a target pixel according to the present invention.

FIG. 5 shows a comparison of peak signal-to-noise ratios (PSNRs) resulted from five different demosaicking methods.

FIG. 6 is a table showing hardware requirements for five different demosaicking methods.

DETAILED DESCRIPTION OF THE PREFERRED EMBODIMENTS

Figure 1:
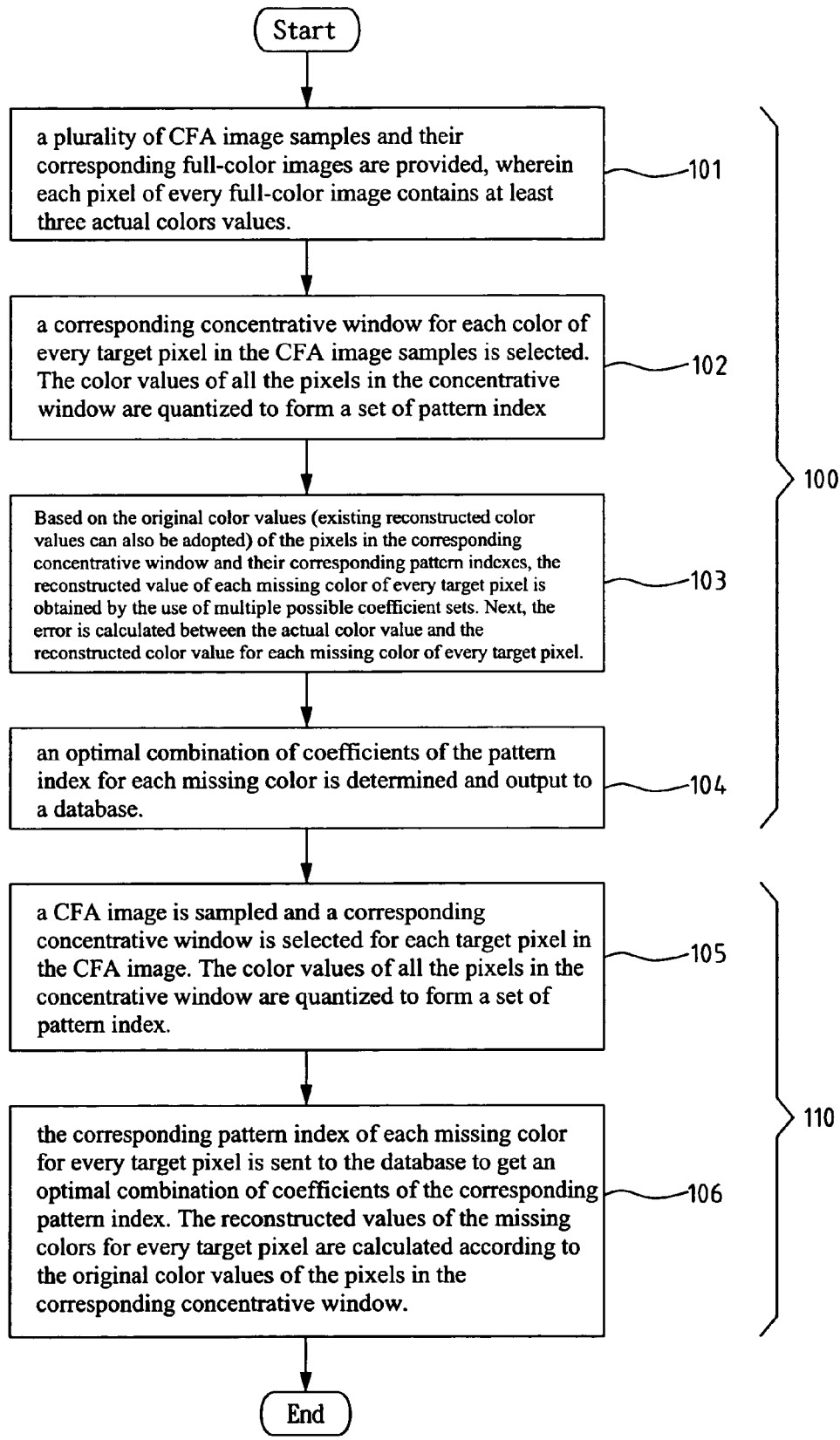
FIG. 1 shows a processing flow of the demosaicking method in a digital image acquisition system according to the present invention.

FIG. 1 depicts a processing flow of the demosaicking method in a digital image acquisition system according to the present invention. The method of the present invention includes two different phases, a data-training phase 100 and a data-practice phase 110. In the data-training phase 100, a huge amount of CFA image samples are input for statistical analysis and compared with their corresponding full-color images. The optimal results are then recorded in a database. In the data-practice phase 110, searching and analyzing the database is performed to reconstruct the CFA images.

Referring to FIG. 1, the data-training phase comprises the steps described in the following. Firstly, a plurality of CFA image samples and their corresponding full-color images are provided, wherein each pixel of every full-color image contains at least three actual colors values, as shown at step 101. Then, a corresponding concentrative window for each color of every target pixel in the CFA image samples is selected. The color values of all the pixels in the concentrative window are quantized to form a set of pattern index, as shown at step 102. Based on the original color values (existing reconstructed color values can also be adopted) of the pixels in the corresponding concentrative window and their corresponding pattern indexes, the reconstructed value of each missing color of every target pixel is obtained by the use of multiple feasible coefficient sets. Next, the error is calculated between the actual color value and the reconstructed color value for each missing color of every target pixel, as shown at step 103. Lastly, an optimal combination of coefficients of the pattern index for each missing color is determined and output to a database, as shown at step 104.

The data-practice phase of the present invention comprises two steps described in the following. At step 105, a CFA image is sampled and a corresponding concentrative window is selected for each target pixel in the CFA image. The color values of all the pixels in the concentrative window are quantized to form a set of pattern index. At step 106, the corresponding pattern index of each missing color for every target pixel is sent to the database described at step 104 to get an optimal combination of coefficients of the corresponding pattern index. The reconstructed values of the missing colors for every target pixel are calculated according to the original color values (existing reconstructed color values can also be adopted) of the pixels in the corresponding concentrative window.

Figure 2A:
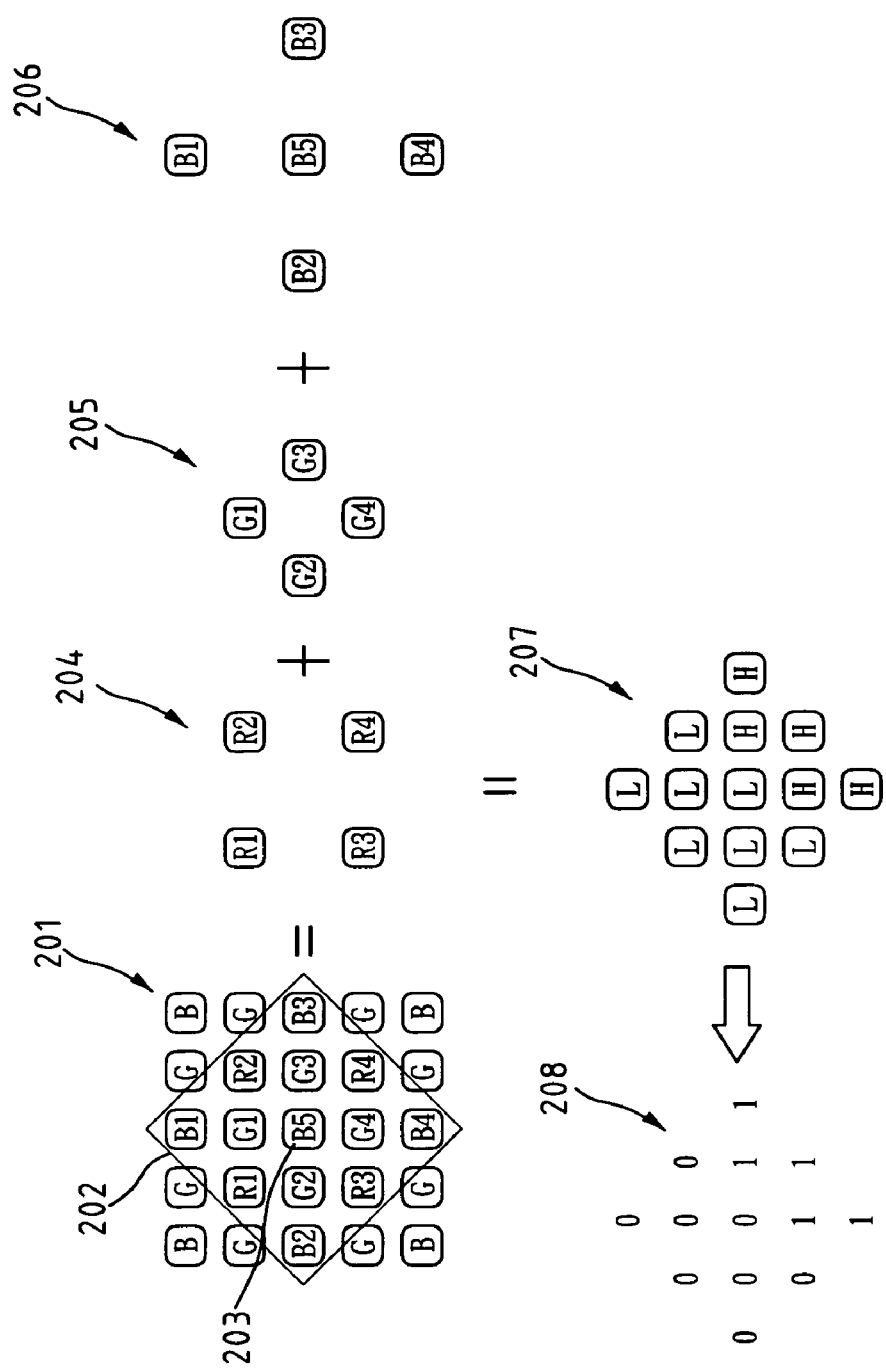
FIG. 2A shows a relationship chart of a color filter array and a concentrative window according to the present invention.

FIG. 2A shows a relationship chart between a color filter array and a concentrative window according to the present invention. FIG. 2B is a relationship table of pattern index, feasible coefficient set of green color, and error value for the target pixel 203 in FIG. 2A. FIG. 2C is a relationship table of pattern index, feasible coefficient set of red color, and error value for the target pixel 203 in FIG. 2A.

Referring to FIG. 2A and step 102, a fixed-size concentrative window 202 is selected from a CFA image 201. The intensities of pixels having same color (as shown by labels 204, 205, and 206) in said concentrative window are compared, and then the color value of each pixel is quantized and represented by at least an intensity bit. In the case of one intensity bit for each pixel, the values of red pixels R1, R2, R3, and R4 labeled as 204 in the concentrative window 202 are compared and then quantized as R1=R2=R3=L=05 (where L represents the low value of logic operation) and R4=H=1 (where H represents the high value of logic operation). The values of green pixels G1, G2, G3, and G4 labeled as 205 in the concentrative window 202 are compared and then quantized as G1=G2=L=0 and G3=G4=H=1. The values of blue pixels B1, B2, B3, B4 and B5 labeled as 206 in the concentrative window 202 are compared and then quantized as B1=B2=B5=L=0 and B3=B4=H=1. The combined set 207 of intensity bits of all the pixels in the concentrative window forms a set of original pattern index 208 (i.e., 0000000110111).

According to the present invention, the reconstructed value of the missing color of the target pixel in the concentrative window is a function of feasible coefficient set and original color values of the pixels in the corresponding concentrative window. That is the reconstructed value of the missing color of the target pixel=F (feasible coefficient set, original color values of the pixels in the corresponding concentrative window). Wherein, the pixels in the concentrative window may contain only a portion of all the pixels located in the window, or equivalently, coefficients of some pixels located in the window may be treated as zeroes. The following description is obtained based on an assumption that the reconstructed value of the missing color of the target pixel is equal to original color value of the target pixel in the corresponding concentrative window times the corresponding feasible coefficient set and then divided by the sum of all the coefficients.

At step 103, the missing colors of the target pixel are green and red. Based on the corresponding pattern index (000001011) (B1, B2, B3, and B4 are ignored here) in the relationship table shown in FIG. 2B, the reconstructed value of the missing green color (not shown in the table) is obtained using multiple feasible coefficient sets 212 (only coefficients for G1, G2, G3, and G4 are adopted here). An error 213 between the reconstructed value of green color and the actual value of green color of the corresponding pixel in the full-color image is then calculated. Same technique can be used repeatedly for other colors. Based on the corresponding pattern index (000001011) in the relationship table shown in FIG. 2C, the reconstructed value of the missing red color (not shown in the table) is obtained using multiple feasible coefficient sets 222 (only coefficients for R1, R2, R3, and R4 are adopted here). An error 223 between the reconstructed value of red color and the actual value of red color of the corresponding pixel in the full-color image is then calculated. These errors represent a possible distance metric of the error between two images, e.g., mean squared error or root mean squared error.

At step 104, the feasible coefficient set having the smallest error is chosen to be the optimal coefficient set. Therefore, the optimal coefficient set for green color and red color corresponding to the pattern index (000001011) are (1100) and (2110), respectively. The above results are recorded in a database. At step 105, the color of the target pixel of the CFA image is assumed to be blue and its corresponding pattern index is (000001011). At step 106, the value of the target pixel in the corresponding concentrative window can be obtained using the pattern index (000001011) as an input for database search. The result is multiplied by a corresponding coefficient and then divided by the sum of all the coefficients to get reconstructed values of the missing colors of the target pixel. The reconstructed values are equal to ½*G1+½*G2 for green color and ½*R1+¼*R2+¼*R3 for red color, respectively (refer to FIG. 2A).

An example is described in the following to further describe the processing flow shown in FIG. 1.

Data-training Phase:

At step 101, a large amount of CFA image samples and their corresponding full-color images are provided for statistical analysis. At step 102, the application of feasible coefficient set is based on a quantized pattern index. At step 103, a constant-hue-based interpolation method is adopted to calculate the values of all pixels that do not have the first color C1. The values of their adjacent pixels having the first color are multiplied by various feasible coefficient sets and then divided by the sum of all coefficients to obtain a reconstructed value C1r. The result is then used with the actual value of the first color of the corresponding pixel in the full color image to calculate a mean square error. At the same time, the intensity bits (i.e., pattern indexes) of the target pixel and its eight neighboring pixels are recorded. The mean square errors calculated from various feasible coefficient sets are recorded as well.

Next, for all pixels that do not have the second color C2, the value $K_{C2}$ (i.e., the difference of color values between C1 and C2) of their adjacent pixels having the second color is obtained as follows: the difference between C1r and C2 is multiplied by various feasible coefficient sets and then divided by the sum of all coefficients. Based on the above result, a reconstructed second color value C2r is obtained by referring to the original color value C1 or the reconstructed color value C1r of the corresponding pixel in the full color image. The reconstructed second color value C2r is then compared with the actual value of the second color of the corresponding pixel in the full color image to calculate a mean square error. At the same time, the intensity bits (i.e., pattern index) of the target pixel and its eight neighboring pixels are recorded. The mean square errors calculated from various feasible coefficient sets are recorded as well. For all pixels that do not have the third color C3, the value $K_{C3}$ (i.e., the difference of color values between C1 and C3) of their adjacent pixels having the third color is obtained as follows: the difference between C1r and C3 is multiplied by various feasible coefficient sets and then divided by the sum of all coefficients. Based on the above result, a reconstructed third color value C3r is obtained by referring to the original color value C1 or the reconstructed color value C1r of the corresponding pixel in the full color image. The reconstructed third color value C3r is then compared with the actual value of the third color of the corresponding pixel in the full color image to calculate a mean square error. At the same time, the intensity bits (i.e., pattern indexes) of the target pixel and its eight neighboring pixels are recorded. The mean square errors calculated from various feasible coefficient sets are recorded as well.

After a statistical analysis is performed on a large amount of input images, the optimal coefficient set having the smallest accumulated mean squared error of the intensity bits (i.e., pattern indexes) of the target pixel and its eight neighboring pixels is stored in the database.

Data-practice Phase:

At step 105, a CFA image is sampled. A corresponding concentrative window is selected for each target pixel in the CFA image, and the color values of all the pixels in the concentrative window are quantized to form a set of pattern index.

At step 106, the pattern index is used as an input to the database for information search. The values of their adjacent pixels having the first color are multiplied by the optimal coefficient set and then divided by the sum of all coefficients to obtain a reconstructed value C1r. Next, the pattern index is used as an input to the database for information search. The difference between C1r and C2 of the neighboring pixels having the second color is multiplied by the optimal coefficient set and then divided by the sum of all coefficients to obtain the difference between C1 and C2. The reconstructed value of the missing second color for the target pixel C2r is equal to C1r−(C1−C2). Lastly, the pattern index is used as an input to the database for information search. The difference between C1r and C3 of the neighboring pixels having the third color is multiplied by the optimal coefficient set and then divided by the sum of all coefficients to obtain the difference between C1 and C3. The reconstructed value of the missing second color for the target pixel C3r is equal to C1r−(C1−C3).

According to the present invention, the value of the missing color of the target pixel in the concentrative window is a function of feasible coefficient set, original color values of the pixels in the corresponding concentrative window, and existing reconstructed values of the target pixels in the corresponding concentrative window. That is the reconstructed value of the missing color of the target pixel=F (feasible coefficient set, original color values of the pixels in the corresponding concentrative window, exsisting reconstructed value of the target pixel in the corresponding concentrative window). Wherein, the pixels in the concentrative window may contain only a portion of all the pixels located in the window, or equivalently, coefficients of some pixels located in the window may be treated as zeroes.

Figure 3:
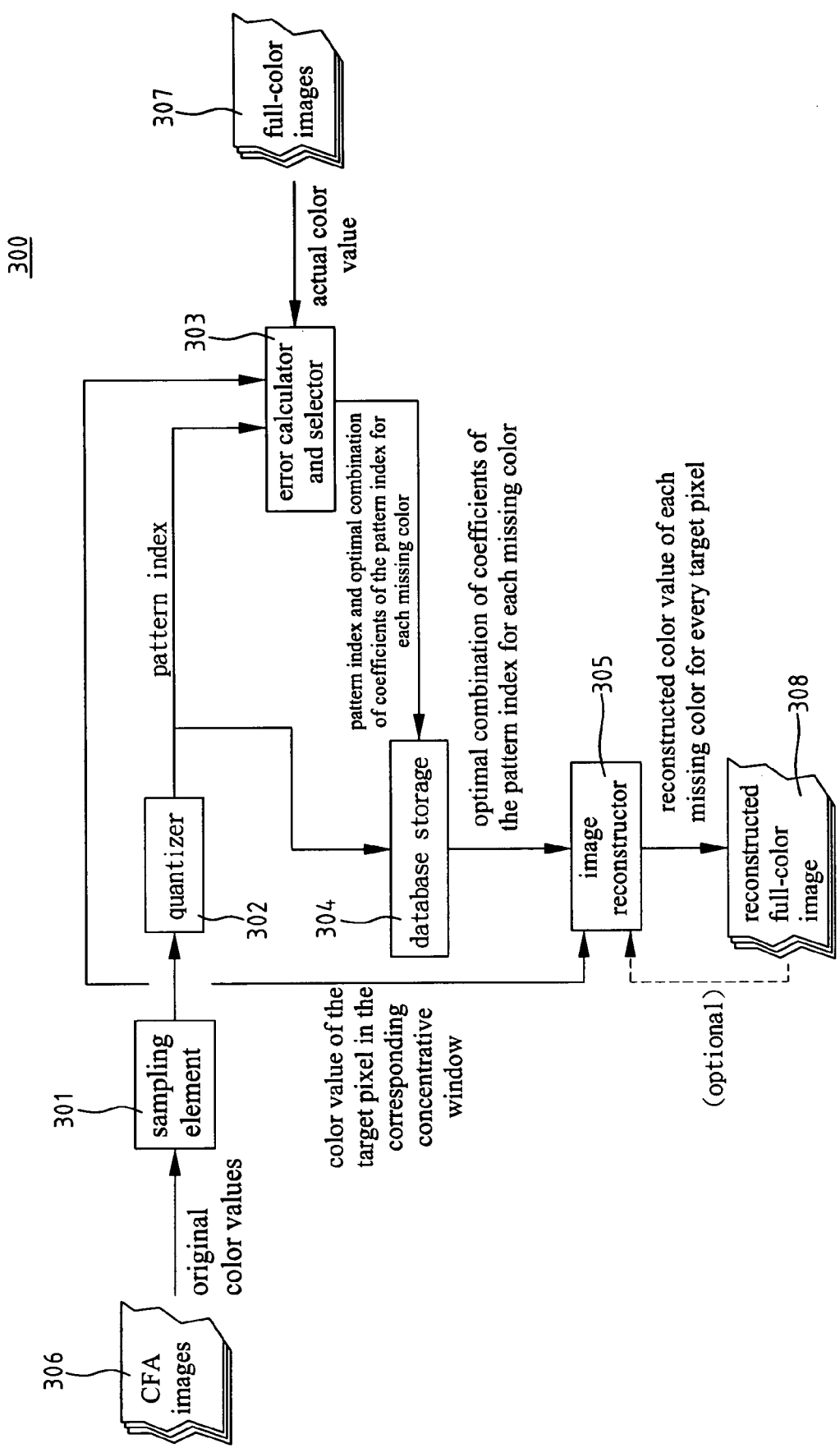
FIG. 3 shows a schematic block diagram of the demosaicking apparatus according to the present invention.

FIG. 3 shows a schematic block diagram of the demosaicking apparatus according to the present invention. Referring to FIG. 3, the present invention provides a CFA demosaicking apparatus 300 in digital image acquisition systems. Said apparatus comprises a sampling element 301, a quantizer 302, an error calculator and selector 303, a database storage 304, and an image reconstructor 305. In the data-training phase, plural CFA images 306 are sampled by the sampling element 301. The sampling element 301 selects a corresponding concentrative window for every target pixel in the CFA images, and then extracts original color values of all the pixels in the concentrative window. The quantizer 302 receives and quantizes the original color values of all the pixels in the concentrative window sent from the sampling element 301, and generates a pattern index.

The error calculator and selector 303 receives the original color values of all the pixels in the concentrative window sent from the sampling element 301 and their corresponding pattern indexes generated by the quantizer 302. Based on the corresponding full-color images 307 of the input CFA images 306, the error calculator and selector uses multiple feasible coefficient sets to get a reconstructed color value of each missing color of every target pixel. The error between reconstructed color value and actual color value is then calculated. After accumulation of a large amount of errors from many image samples, an optimal combination of coefficients of the pattern index for each missing color of the target pixel is determined based on the multiple feasible coefficient sets and their corresponding accumulated errors. The database storage 304 receives and stores the pattern index and the optimal combination of coefficients of the pattern index for each missing color generated by the error calculator and selector.

In the data-practice phase, plural CFA images 306 are sampled by the sampling element 301. The sampling element 301 selects a corresponding concentrative window for every target pixel in the CFA images, and then extracts original color values of all the pixels in the concentrative window. The quantizer 302 receives and quantizes the original color values of all the pixels in the concentrative window sent from the sampling element 301, and regenerates a set of pattern index. The database storage 304 produces an optimal combination of coefficients for each missing color of the target pixel based on the pattern index generated by the quantizer 302. The image reconstructor 305 generates a reconstructed color value of each missing color for every target pixel based on the optimal combination of coefficients of the pattern index generated by the database storage 304 for each missing color of the target pixel and the color values of the pixels in the corresponding concentrative window. A reconstructed full-color image 308 of the CFA image 306 is then achieved.

Wherein, the data storage 304 is a recordable medium, such as a random access memory or a read-only memory or a flash card or a compact disc.

Moreover, the dash line from the reconstructed full-color image 308 to the image reconstructor 305 represents that the feedback of a reconstructed color value to the image reconstructor 305 is optional. This feedback can readjust and reconstruct the reconstructed values of other colors. Therefore, it increases the flexibility of the calculation method of the present invention.

The implementation of such image acquisition system may be divided into two parts: an offline system and an online system. The offline part of the system, comprising of a sampling element 301, a quantizer 302, an error calculator and selector 303, a database storage 304, performs the data-training phase. The offline may be implemented logically, e.g. by computer simulation. The online part of the system, comprising of a sampling element 301, a quantizer 302, a database storage 304, and an image reconstructor 305, performs the data-practice phase. Such design lacks the ability to modify database real-time, but simplifies the design and lowers the cost of the system. Certain degree of flexibility is still available by providing the ability to reprogram, install, and/or select the database(s) installed on the online system.

Figure 4A:
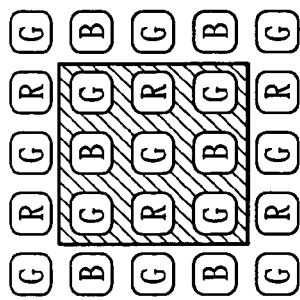
FIGS. 4A and 4B are two concentrative windows of different shapes.
Figure 4B:
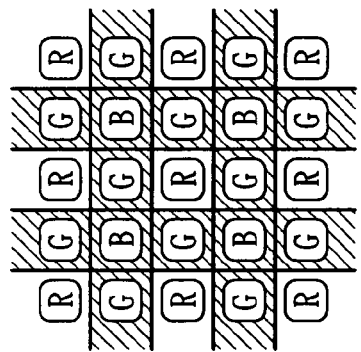

FIGS. 4A and 4B are two concentrative windows of different shapes. Concentrative windows can have various shapes, such as square (shown in FIG. 4A), diamond, and # shape (shown in FIG. 4B) etc. Different CFA images may correspond to concentrative windows of different shapes. Moreover, interpolations of different color positions (including different missing colors) in same kind of CFA image may correspond to different concentrative windows.

According to the present invention, the image samples used in the data-training phase can be properly screened, i.e., selectively storing image samples into the database. When the auto-correlation of all concentrative windows of a new image sample is lower than a particular threshold value, there are many occurrences having plural feasible coefficient sets with same corresponding pattern index during statistical analysis process. And, the values of their mean squared errors are about the same. This means that they are dispersed. If the cross-correlation between said image sample and other images is lower than a particular threshold value, said image sample is a unique image and won't be stored into the database. Generally speaking, this kind of images has abundant or complex content. Even if they are not included in the database for statistical analysis, the quality of their reconstructed images won't be significantly affected. The reason is that such detailed structures of the images is beyond the perception of human eyes.

There is another screening rule adopted in the present invention. If any image sample causes a significant reduction of the PSNR (peak signal-to-noise ratio) value of the reconstructed image during statistical analysis process, the image sample won't be stored into the database.

FIG. 5 shows a comparison of PSNR values resulted from five different demosaicking methods. Referring to FIG. 5, the PSNR comparison are performed with five demosaicking methods on twelve pictures provided by a Kodak picture CD. The five demosaicking methods include the methods of Gunturk, Lu, back projection (BP), Pei and the present invention. In the BP method, a post processing is further performed after the three colors values of every pixel is constructed in order to minimize the noise and the zipper shape effect. Firstly, the Kr and Kb values of the pixels located in the outer ring of a # shape are calculated using the BP method. The color values of the pixel located in the center of a# shape are equal to the average values of Kr' and Kb' of said outer pixels. The color values of the two missing colors of the central pixel can be derived from the color value of the central pixel in the original image sample and the values of Kr' and Kb'. The results obtained in this way are closer to the actual values than those obtained without a post processing. In general, the higher the PSNR value is the closer the reconstructed image to the actual image. As can be seen from FIG. 5, the demosaicking results of the present invention is close to those obtained with Gunturk and Lu's methods and better than those obtained with Pei+BP and PR+BP methods.

FIG. 6 is a table showing hardware requirements for five different demosaicking methods. As can be seen from FIG. 6, the hardware requirements of the present invention is lower than Gunturk and Lu's methods but higher than Pei+BP and PR+BP methods.

From the above comparisons for five demosaicking methods, it can be seen that the present invention provides a demosaicking result as good as those obtained with Gunturk and Lu's methods and only requires a slightly more hardwares than Pei+BP and PR+BP methods. Besides, the demosaicking method of the present invention is easy for hardware implementation. According to the present invention, all the pixel relations are stored as a database for statistical analysis. The database is not limited to only one set. It can be adjusted or updated depending on desired applications. For example, different databases can be adopted for human images and for scenery images. Furthermore, the statistical database can be stored in a way that allows random access to the memories. The database can be updated any time depending on users' needs. The database may be created statically or dynamically. Dynamical adjustments are allowed after the database is statically created.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A demosaicking method for color filter array (CFA) interpolation in digital image acquisition systems, said demosaicking method includes a data-training phase and a data-practice phase, said data-training phase comprises the steps of:

(a1) preparing a plurality of CFA image samples and their corresponding full-color images, wherein each pixel of every said full-color image contains at least three colors values;

(a2) selecting a corresponding concentrative window for each color of every target pixel in said CFA image samples, and quantizing color values of all the pixels in said concentrative window to form a pattern index;

(a3) using multiple feasible coefficient sets to reconstruct the value of each missing color of every said target pixel based on the color values of the pixels in the corresponding concentrative window and their corresponding pattern indexes, and then calculating the error between the actual color value and said reconstructed color value for each missing color of every target pixel; and (a4) determining the optimal coefficient set of the pattern index for each missing color, and then outputting said optimal coefficient set to a database;

Said data-practice phase comprises the steps of:

(b1) inputting a CFA image, and selecting a corresponding concentrative window for each target pixel in the CFA image sample, and quantizing color values of all the pixels in said concentrative window to form a set of pattern index; and (b2) inputting the corresponding pattern index of each missing color for every target pixel to said database described at step (a4) to get the optimal combination of coefficients of the corresponding pattern index, and then calculating the reconstructed values of the missing colors for every target pixel according to the color values of the pixel in the corresponding concentrative window.

2. The demosaicking method for CFA interpolation in digital image acquisition systems as claimed in claim 1, wherein said quantization action at step (a2) is to compare the intensities of all pixels having the same color in said concentrative window with one another, and then digitize said intensities and represent each of them by at least a bit.

3. The demosaicking method for CFA interpolation in digital image acquisition systems as claimed in claim 1, wherein said concentrative window at step (a2) is an area covering said target pixel and its neighboring pixels, and the number of said neighboring pixels is limited.

4. The demosaicking method for CFA interpolation in digital image acquisition systems as claimed in claim 1, wherein the pixels in the corresponding concentrative window of said target pixel at steps (a3) and (b2) include all the pixels located in said corresponding concentrative window.

5. The demosaicking method for CFA interpolation in digital image acquisition systems as claimed in claim 1, wherein the pixels in the corresponding concentrative window of said target pixel at steps (a3) and (b2) include only a portion of pixels located in said corresponding concentrative window.

6. The demosaicking method for CFA interpolation in digital image acquisition systems as claimed in claim 1, wherein said color values at steps (a3) and (b2) are original color values.

7. The demosaicking method for CFA interpolation in digital image acquisition systems as claimed in claim 1, wherein said color values at steps (a3) and (b2) include original color values and at least one existing reconstructed color value.

8. The demosaicking method for CFA interpolation in digital image acquisition systems as claimed in claim 1, wherein said reconstructed value of the missing color of said target pixel in said corresponding concentrative window at steps (a3) is a function of feasible coefficient set and original color values of the pixels in the corresponding concentrative window.

9. The demosaicking method for CFA interpolation in digital image acquisition systems as claimed in claim 8, wherein said reconstructed value of the missing color of said target pixel in said corresponding concentrative window at steps (a3) is a function of feasible coefficient set, original color value and exsisting reconstructed color values of the target pixels in the corresponding concentrative window.

10. The demosaicking method for CFA interpolation in digital image acquisition systems as claimed in claim 1, wherein said determination action at step (a4) is to select a feasible coefficient set having the smallest error as an optimal coefficient set from said many feasible coefficient sets.

11. The demosaicking method for CFA interpolation in digital image acquisition systems as claimed in claim 1, wherein said error value at step (a3) is the difference between measured distances for two images.

12. A demosaicking apparatus for CFA interpolation in digital image acquisition systems, comprising:

a sampling element selecting a corresponding concentrative window for every target pixel in the CFA images based on the plural input CFA images, and then extracting original color values of all the pixels in said concentrative window;

a quantizer receiving and quantizing the original color values of all the pixels in said concentrative window to form a set of pattern index;

an error calculator and selector receiving the original color values of said all pixels and said corresponding set of pattern index, using multiple feasible coefficient sets to get a reconstructed color value of each missing color of every target pixel based on the corresponding full-color images of said input CFA images, calculating the error between reconstructed color value and actual color value, and determining and generating an optimal combination of coefficients of the pattern index for each missing color of said target pixel based on said multiple feasible coefficient sets and their corresponding errors;

a database storage receiving and storing said set of pattern index and said optimal combination of coefficients of the pattern index for each missing color, and reproducing an optimal combination of coefficients of the pattern index for each missing color; and an image reconstructor generating a reconstructed color value of each missing color for every target pixel based on said optimal combination of coefficients of the pattern index for each missing color of the target pixel and the color values of the pixels in the corresponding concentrative window.

13. The demosaicking apparatus for CFA interpolation in digital image acquisition systems as claimed in claim 12, wherein the pixels in the corresponding concentrative window of said target pixel used by said image reconstructor include all the pixels located in said corresponding concentrative window.

14. The demosaicking apparatus for CFA interpolation in digital image acquisition systems as claimed in claim 12, wherein the pixels in the corresponding concentrative window of said target pixel used by said image reconstructor include only a portion of pixels located in said corresponding concentrative window.

15. The demosaicking apparatus for CFA interpolation in digital image acquisition systems as claimed in claim 12, wherein said error calculator and selector selects a feasible coefficient set having the smallest error as an optimal coefficient set from said many feasible coefficient sets.

16. The demosaicking apparatus for CFA interpolation in digital image acquisition systems as claimed in claim 12, wherein said error value is the difference between measured distances for two images.

17. The demosaicking apparatus for CFA interpolation in digital image acquisition systems as claimed in claim 12, wherein said database storage is a recordable medium.

18. The demosaicking apparatus for CFA interpolation in digital image acquisition systems as claimed in claim 12, wherein said database storage is chosen from the group of random access memory, read only memory, memory card, and optical disk.

19. The demosaicking apparatus for CFA interpolation in digital image acquisition systems as claimed in claim 12, wherein said color value used by said image reconstructor is the original color value.

20. The demosaicking apparatus for CFA interpolation in digital image acquisition systems as claimed in claim 19, wherein said image reconstructor uses said original color value as well as existing reconstructed color values to produce reconstructed color values for other colors.

21. The demosaicking apparatus for CFA interpolation in digital image acquisition systems as claimed in claim 12, wherein said demosaicking apparatus is divide into an offline system performing a data-training phase and an online system performing a data-practice phase.

22. The demosaicking apparatus for CFA interpolation in digital image acquisition systems as claimed in claim 21, wherein said offline system includes said sampling element, said quantizer, said error calculator and selector, and said database storage.

23. The demosaicking apparatus for CFA interpolation in digital image acquisition systems as claimed in claim 12, wherein said online system includes said sampling element, said quantizer, said database storage, and said image reconstructor.

24. The demosaicking apparatus for CFA interpolation in digital image acquisition systems as claimed in claim 21, wherein said demosaicking apparatus provides the abilities to reprogram, and/or select the databases installed on said online system.

\* \* \* \* \*